(12) United States Patent
Kodama et al.

(10) Patent No.: US 6,354,963 B1
(45) Date of Patent: Mar. 12, 2002

(54) GOLF CLUB HEAD

(75) Inventors: Hitoshi Kodama; Hidehiro Takemoto; Takumi Ishimori; Kiharu Numata; Tsuneo Takano, all of Toyohashi (JP)

(73) Assignee: Mitsubishi Rayon Co., Ltd. (JP)

( * ) Notice: Subject to any disclaimer, the term of this patent is extended or adjusted under 35 U.S.C. 154(b) by 0 days.

(21) Appl. No.: 09/290,649

(22) Filed: Apr. 12, 1999

(30) Foreign Application Priority Data

| Apr. 10, 1998 | (JP) | 10-099062 |
| Aug. 12, 1998 | (JP) | 10-228393 |
| Feb. 9, 1999 | (JP) | 11-031867 |

(51) Int. Cl.[7] .............................................. A63B 53/04
(52) U.S. Cl. ...................................... 473/345; 473/349
(58) Field of Search ................................ 473/324, 345, 473/346, 349, 350, 342, 347, 348, 290, 291, 287, 334, 335

(56) References Cited

U.S. PATENT DOCUMENTS

| 4,664,383 A | * | 5/1987 | Aizawa |
| 4,754,975 A | * | 7/1988 | Aizawa |
| 5,242,168 A | * | 9/1993 | Aizawa |
| 5,342,812 A | * | 8/1994 | Niskanen |
| 5,346,217 A | * | 9/1994 | Tsuchiya |
| 5,839,975 A | * | 11/1998 | Lundberg |
| 5,851,160 A | * | 12/1998 | Rugge |

* cited by examiner

Primary Examiner—Sebastiano Passaniti
(74) Attorney, Agent, or Firm—Morrison Law Firm

(57) ABSTRACT

A hollow golf club head provides for a longer flight distance, a larger "sweet spot", and reduced veering in the flight path than a conventional golf club head. The golf club head has a maximum weight of 200 g, a volume in the range from 300 to 900 cc and a moment of inertia of at least $4 \cdot 10^{-4}$ kg·m². The head is made from a fiber reinforced epoxy resin which provides at least 30 kg/mm². Suitable reinforcing fibers include carbon fiber, fiberglass, aramid fiber and polyester fiber. Suitable resin materials include epoxy resin, unsaturated polyester resin and vinyl ester resin. The reinforcing fibers in the resin are arranged such that adjacent layers of reinforcing material are oriented perpendicular to one another. The perpendicular orientation of the fibers provide shock resistance to the head. A high elasticity and high density component, such as tungsten, is dispersed in the resin to provide reduced vibrations and improved acoustics to the head when impacting a ball. The outer layer of the head can be made from a metal material, such as titanium, to minimize damage to the face and the sole of the head due to friction. The club head is formed by: cutting fiber prepregs into a specified shape, placing the cut fiber prepregs into a two-piece concave mold such that the fibers in adjacent layers are aligned perpendicular to one another, closing the two-part concave mold around a nylon tube bag, pressurizing the nylon tube bag as the closed two part mold is heated to 130° C. for 1 hour, and splitting the mold open after heating to provide a hollow golf club head.

30 Claims, 4 Drawing Sheets

GOLF CLUB HEAD

BACKGROUND OF THE INVENTION

The present invention relates to a golf club head. More specifically, the present invention relates to a hollow, wood golf club head.

With wood golf clubs such as drivers, spoons, and brassies, the flight distance and directional control over the golf ball is considered important. It is known that the flight distance and directional control are affected by the moment of inertia around the center of gravity of the golf club head. The moment of inertia increases as the volume of the golf club head increases. As a result, hollow golf club heads made from metal materials, such as stainless steel, titanium alloy, and high-tensile aluminum alloys have become prominent among wood golf club heads. This, in part, is due to the higher moments of inertia which are possible with hollow golf club heads. As a result, the golf club heads themselves have become larger (e.g., Japanese laid-open patent publication number 4-256764).

A hollow golf club head provides for a longer flight distance, a larger "sweet spot", and reduced veering in the flight path when compared to previous solid-core heads such as persimmon heads. However, the large specific gravity of the metals used in conventional hollow golf club heads places a limit, from the standpoint of strength, on the degree to which the moment of inertia of the entire club head can be increased by increasing the volume of the hollow section of the club head.

OBJECTS AND SUMMARY OF THE INVENTION

It is an object of the present invention to provide a golf club head which overcomes the drawbacks in the prior art.

It is another object of the present invention to provide a golf club head which has a large moment of inertia.

It is yet another object of the present invention to provide a golf club head which is well suited for use in a golf club such as a driver.

It is still another object of the present invention to provide a golf club head which has a large moment of inertia, while maintaining adequate strength for use in a driver type golf club.

It is a further object of the present invention to provide a hollow golf club head with a large moment of inertia while maintaining adequate strength for use in a driver type golf club, in which the veering of the flight path and the corresponding loss in distance is very small.

It is yet a further object of the present invention to provide a hollow golf club head which minimizes veering in the flight path of a golf ball and also minimizes the corresponding loss in flight distance due to veering.

It is an object of the present invention to provide a hollow golf club head in the form of a hollow head that is made from a material having a specific strength of at least 30 kg/mm$^2$ and that has a moment of inertia around a perpendicular axis passing through the center of gravity when the head is at a standard usage position of at least $4 \cdot 10^{-4}$ kg·m$^2$. It is desirable for the weight of the golf club head described above to be no more than 200 g, the volume of the golf club head to be in the range from 300 to 900 cc, and the thickness of the face of the head to be at least 4 mm. Furthermore, it is desirable to have a metal fiber paper and/or a metal film layered on the exterior surface of the head. It is also desirable to use a bidirectional carbon fiber reinforced epoxy resin or the like for materials having a specific strength of at least 30 kg/mm$^2$.

Briefly stated, a hollow golf club head provides for a longer flight distance, a larger "sweet spot", and reduced veering in the flight path than a conventional golf club head. The golf club head has a maximum weight of 200 g, a volume in the range from 300 to 900 cc and a moment of inertia of at least $4 \cdot 10^{-4}$ kg·m$^2$. The head is made from a fiber reinforced epoxy resin which provides at least 30 kg/mm$^2$. Suitable reinforcing fibers include carbon fiber, fiberglass, aramid fiber and polyester fiber. Suitable resin materials include epoxy resin, unsaturated polyester resin and vinyl ester resin. The reinforcing fibers in the resin are arranged such that adjacent layers of reinforcing material are oriented perpendicular to one another. The perpendicular orientation of the fibers provide shock resistance to the head. A high elasticity and high density component, such as tungsten, is dispersed in the resin to provide reduced vibrations and improved acoustics to the head when impacting a ball. The outer layer of the head can be made from a metal material, such as titanium, to minimize damage to the face and the sole of the head due to friction. The club head is formed by: cutting fiber prepregs into a specified shape, placing the cut fiber prepregs into a two-piece concave mold such that the fibers in adjacent layers are aligned perpendicular to one another, closing the two-part concave mold around a nylon tube bag, pressurizing the nylon tube bag as the closed two part mold is heated to 130° C. for 1 hour, and splitting the mold open after heating to provide a hollow golf club head.

According to an embodiment of the invention, there is provided a hollow golf club head comprising a material having a specific strength of at least 30 kg/mm2 wherein a moment of inertia around a vertical axis passing through a center of gravity when the head is in a usage position is 4·10–4 kg·m$^2$.

According to another embodiment of the invention, there is provided for a golf club head comprising a carbon fiber, bidirectionally reinforced epoxy resin material with a specific strength of at least 30 kg/mm$^2$ wherein a moment of inertia around a vertical axis passing through a center of gravity when the head is in a usage position is 4·10–4 kg·m$^2$, the head having a maximum weight of 200 g, the head having a volume in a range from 300 to 900 cc, the head having a face with a minimum thickness of 4 mm and an exterior surface of the head is layered with a metal fiber material with a plurality of openings.

According to yet another embodiment of the invention, there is provide for a hollow golf club head for striking a golf ball when the golf club head is in a usage position, comprising: a composite material formed in a shape, the composite material having a specific strength in a range from 30 to 60 kg/mm$^2$, and a moment of inertia around a vertical axis passing through a center of gravity of the golf club head when the golf club head is in the usage position.

According to an embodiment of the invention, there is provide for a hollow golf club head for striking a golf ball when the golf club head is in a usage position, comprising: a composite material formed in a shape, the composite material having a specific strength in a range from 30 to 60 kg/mm$^2$, a moment of inertia around a vertical axis passing through a center of gravity of the golf club head when the golf club head is in the usage position, the moment of inertia is at least $4 \cdot 10^{-4}$ kg·m$^2$, the golf club head having a minimum volume of 300 cc, the composite material having a head thickness of at least 3 mm, and the composite material including a bidirectionally reinforced matrix resin having an amount of reinforcement material dispersed therein in a range from 40% to 70% of a total volume of the matrix resin.

According to a method of the present invention, there is provided a method for forming a hollow golf club head, the steps comprising: cutting a metal film material to form a shaped metal material, cutting a first fiber reinforced resin material to form a first shaped material, cutting a second fiber reinforced resin material to form a second shaped material, placing the shaped metal material on inner surfaces of a two-piece concave mold, placing the first shaped material on the shaped metal material while the shaped metal material is in the concave mold, placing the second shaped material on the first shaped material while the first shaped material is on the shaped metal material in the concave mold, such that fibers in the first and second shaped materials are oriented in a direction perpendicular to one another, placing a nylon tube bag on the second shaped material such that when the two-part mold is closed the nylon bag remains within the closed mold while the tube extends out of the concave mold, closing the concave mold with to form a closed mold, the closed mold having a tube extending out of the concave mold, forcing air at a pressure of 4 kg/cm2 through the tube into the nylon bag inside the closed mold to form a pressurized mold, heating the pressurized mold at a temperature of 130 C. for 1 hour, and splitting the pressurized mold open after the step of heating to provide the hollow golf club head.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
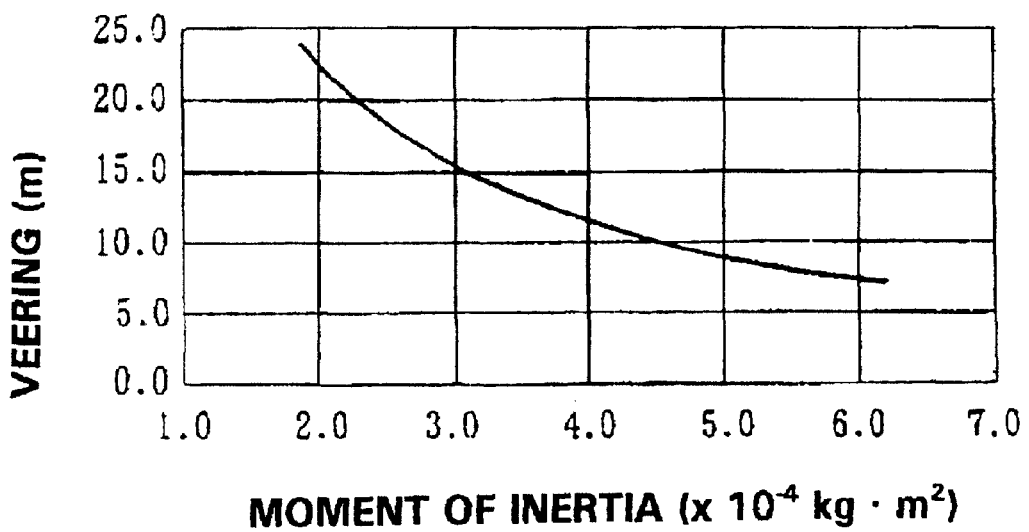
FIG. 1 is a graph showing the relationship between the moment of inertia and the veering of the flight path.

The moment of inertia of a golf club head (hereinafter referred to as "head") can be utilized to decrease the veering in the flight path and the corresponding loss in distance. When a golf ball is hit with a golf club, the impact between the head and the ball can be expressed as:

$$\text{impact} = (\text{club head weight}) \cdot (\text{acceleration of the head}) \quad (1)$$

This impact corresponds to the change in the ball's momentum during the period of impact, and can be expressed as:

$$\text{impact} = ((\text{ball weight}) \cdot (\text{ball acceleration} \cdot 2)) / (\text{period of impact}) \quad (2)$$

The period of impact between a ball, having a weight of 46 g, and a club head has been measured at $5/100000^{ths}$ of a second using stop-motion photography methods. Thus, if the initial acceleration of the ball is 50 m/sec, a load of 940 kg is applied to the ball at the moment of impact.

Measurements have shown that there are no deformations in the club shaft during impact between the head and the ball. Thus, only kinetic energy is exchanged between the ball and the head at the moment of impact. Also, it is presumed that a portion of the kinetic energy in the head is transferred to the ball.

Since only kinetic energy is a factor at the moment of impact, the flight distance of the ball is proportional to the kinetic energy of the head which can be expressed as: kinetic energy=weight·acceleration$^2$. In other words, distance can be increased by increasing the weight of the head and/or the head speed. However, if these are factors are increased carelessly, it may become difficult as a practical matter to provide a sweet spot on the impact surface of the head.

The sweet spot of a head refers to the point where the center of gravity of the head (represented by an imaginary line passing through center of gravity) intersects with the impact surface (face) of the head at a right angle. If the ball does not contact the sweet spot of the head at the moment of impact, the ball will not travel in an expected direction. Assuming that the loft angle at the face is 0°, the veering of the ball in the horizontal plane would be calculated as described below.

If the ball is not hit with the sweet spot of the head, a torque is generated around a vertical axis passing through the center of gravity of the head. This torque causes the head to rotate. This torque is calculated as follows:

$$\text{torque} = (\text{impact}) \cdot (\text{center of gravity} - \text{point of impact}) \quad (3)$$

Thus, when a 46 g ball is hit 3 cm off to the left or the right of the sweet spot in the horizontal plane, the torque can be calculated as:

$$\text{torque} = (940 \text{ kg}) \cdot (0.03 \text{ m}) = 28.2 \text{ kg} \cdot \text{m} \quad (3')$$

The rotational energy of the head is expressed as:

$$\text{rotational energy} = (\text{moment of inertia}) \cdot (\text{angular acceleration}) \quad (4)$$

Since the rotational energy and the torque balance out, equation (3') and equation (4) can be used to determine the angular acceleration of the rotation of the head. The moment of inertia in a standard head is $2 \cdot 10^{-4}$ kg·m$^2$. The angular acceleration for a standard head is calculated as follows:

$$\text{angular acceleration} = (28.2 \text{ kg} \cdot \text{m}) \cdot (9.8 \text{ m}/\text{sec}^2) / (2 \cdot 10^{-4} \text{ kg} \cdot \text{m}^2)$$

$$= 1.38 \cdot 10^6 \text{ rad/sec}^2$$

The impact time period is multiplied by this angular acceleration to determine the rotational velocity, which is $(1.38 \cdot 10^6 \text{ rad/sec}^2) \cdot (0.0005 \text{ sec}) = 690$ rad/sec. The rotation angle can be expressed as:

$$\text{rotation angle} = (\text{angular velocity}) \cdot (\text{impact period})^2 / 2 \quad (5)$$

resulting in a rotation angle of 9.9°.

From the above calculations, it can be understood that if a 46 g ball is hit 3 cm away from the sweet spot, the head will rotate 9.9 degrees in $5/10000$ sec.

The rotation of the head causes the trajectory angle of the ball to veer to the left or right during flight. Using simple calculations, a total flight distance of 200 m results in the ball veering to the left or right away from a target by roughly 30 m.

Furthermore, the flight distance of the ball will decrease since the rotation of the head consumes a portion of the kinetic energy in the head instead of transferring the energy to the ball. The decrease in the flight distance due to rotation of the head (causing a loss of kinetic energy) can be expressed as: (weight)·(head speed)$^2$/2. For a head having a weigh of 200 g and a speed of 50 m/sec, 250 J of energy is lost due to rotation. The rotational energy of the head can be expressed as: (moment of inertia)·(rotational velocity)$^2$/2. Thus, for a moment of inertia of 2·10$^{-4}$ kg·m$^2$ and a rotational velocity is 690 rad/sec, the head has a rotational energy of 48 J. In other words, if the head rotates when the ball is hit, approximately 20% of the kinetic energy of the head is lost and the distance is reduced by approximately 20%.

Figure 2:
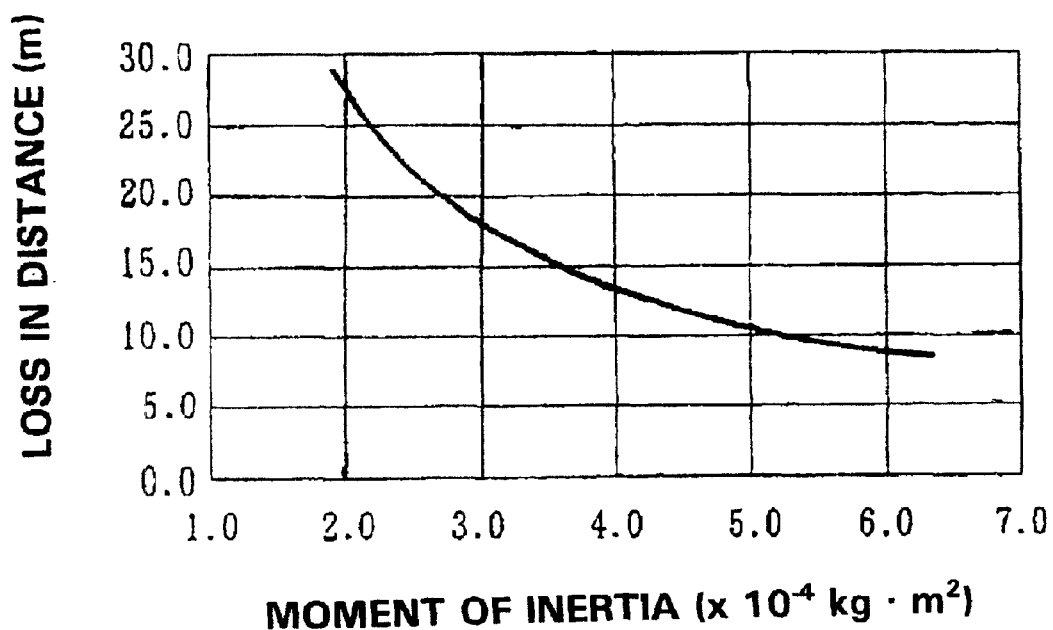
FIG. 2 is a graph showing the relationship between the moment of inertia and the decrease in distance.

FIGS. 1 and 2 show graphs indicating the offset from the ball's desired target and drop in distance when the above described calculations are performed for different moments of inertia. For each graph shown in FIGS. 1 and 2, the head has a weight of 200 g, the head speed at the moment of impact is 40 m/sec, and the ball is hit 2 cm from the sweet spot. The vertical axis in FIG. 1 indicates the offset (veering) of the ball from the target point when the distance is 200 m. The vertical axis in FIG. 2 indicates the decrease in distance corresponding to the loss of kinetic energy. The horizontal axes in both FIGS. 1 and 2 represent the moment of inertia of the head. Based on these graphs, it can be seen that increasing the moment of inertia of the head can reduce the veering of the ball and the corresponding decrease in distance even if the point of impact of the ball on the head is slightly off from the sweet spot.

Figure 3:
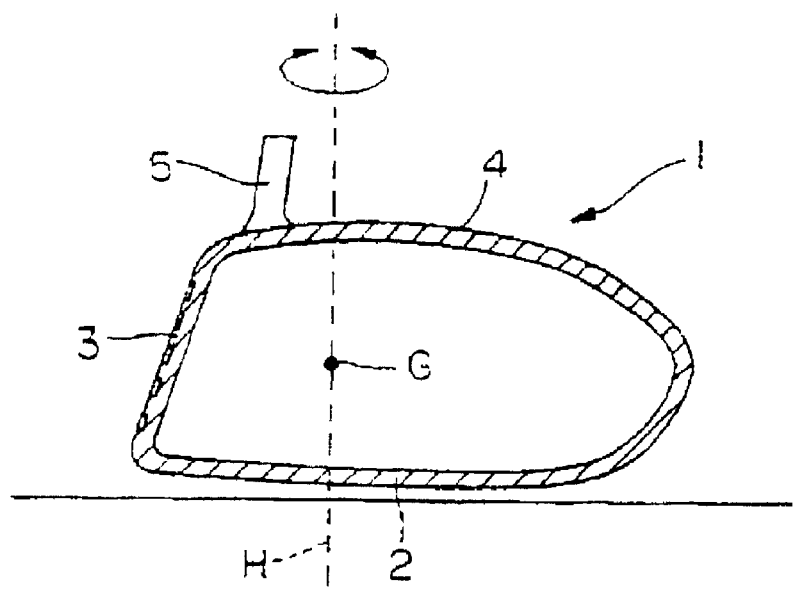
FIG. 3 is a drawing for the purpose of describing the definition of the moment of inertia in the head of the present invention.

Referring to FIG. 3, the moment of inertia in the present invention refers to the moment around a vertical axis (H) passing through a center of gravity (G) when a sole (2) of a head (1) is positioned on a horizontal plane (i.e. the head is placed in a standard usage position). Referring to the figure, there is shown a face (3), a crown (4), and a neck (5).

Figure 4:
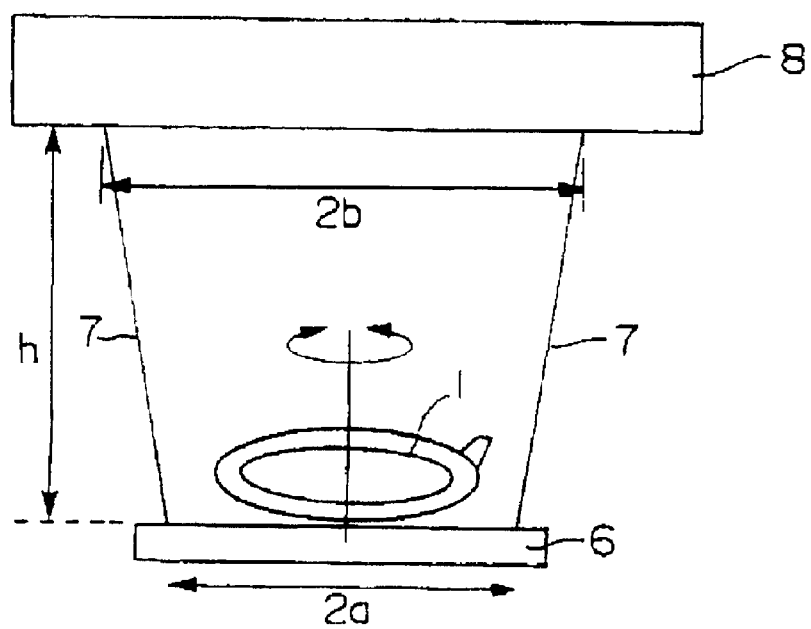
FIG. 4 is a schematic drawing showing the structure of the measuring device for the moment of inertia in the present invention.

FIG. 4 shows the device used for measuring the moment of inertia according to the bifilar pendulum measurement method. The head (1), shown as a cross section, is mounted on a flat, disc-shaped support base (6). The support base (6), whose moment of inertia is known, is suspended from a base (8) using two wires (7, 7). From this state, the support base (6) is twisted and then released so that it can rotate freely. The time period for this rotation is measured. The moment of inertia of the head (1) is calculated as shown below in equation (A).

$$Ig=(T^2/4\ \pi^2)\cdot((mg+mb)\cdot g\cdot a\cdot b/h)-Ib \qquad (A)$$

where:

Ig is the moment of inertia of the head (1);

Ib is the moment of inertia of the support base (6);

mg is the weight of the head (1);

mb is the weight of the support base (6);

T is the time period;

g is the gravitational acceleration; and a, b, and h are (a), (b) and (h) from FIG. 4.

As described in detail above, increasing the moment of inertia of the head will decrease the veering of the ball and will reduce the corresponding loss in distance. To increase the moment of inertia of the head, the dimensions of the head can be increased. However, an increase in head dimensions may excessively increase the overall head weight making it difficult and impractical to swing the golf club. In practice, the weight of the head can be a maximum of 200 g. Increasing the dimensions of the head while keeping the weight fixed requires making the head hollow and increasing the volume as much as possible.

Head volume and moment of inertia are indicators of overall head size. A large hollow head can be made with a head weight of 200 g, a volume of 300 cc, and a moment of inertia of 3·10$^{-4}$ kg·m$^2$ using a metal such as stainless steel, titanium alloy, high-tensile aluminum alloy or the like. However, a head designed to these parameters has a thin structural wall and might be destroyed upon impact with a ball. An even larger head can be made with a moment of inertia of 4·10$^{-4}$ kg·m$^2$, and the thickness at the face and the like would be 1 mm or less. Tests have confirmed that these heads can actually break during impact with a ball.

The weakness in the walls of these heads is due to the properties of the materials used in constructing the heads. Since the metals used to manufacture heads have a high specific gravity, their specific strength (tensile strength (kg/mm$^2$)/specific gravity) is low. These metals have actual specific strengths in the range from 14 to 16 kg/mm$^2$. The maximum moment of inertia for heads using this type of material is approximately 3·10$^{-4}$ kg·m$^2$. Thus, it is not possible to provide a higher moment of inertia by increasing the dimensions (volume) of the head when using these metals.

As can be seen from the graphs in FIGS. 1 and 2, the moment of inertia of the head must be at least 4·10$^{-4}$ kg·m$^2$ in order to minimize the veering of the ball and the loss in distance within an acceptable range. A moment of inertia in this range can be obtained by using a head volume of at least 300 cc. However, if the head volume is too large, the face becomes thin which possibly leads to the head breaking upon impact. It is desirable for the minimum thickness of the face to be at least 4 mm in order to prevent the hollow head from breaking upon impact. As a result of research, it was found that to provide a minimum thickness of at least 4 mm at the face, a material having a specific strength of at least 30 kg/mm$^2$ and a maximum head volume of 900 cc are required.

Materials which have a specific strength of at least 30 kg/mm$^2$ include fiber-reinforced plastics. Fiber-reinforced plastics have reinforcement fibers impregnated in a matrix resin such as epoxy resin, unsaturated polyester resin, or vinyl ester resin. A fiber-reinforced material is formed by lining up reinforcing fibers in a "one-directional" pre-impregnation (hereinafter referred to a prepreg) and then immersing the aligned fiber material in a resin. Examples of reinforcement fibers which are used in fiber-reinforced plastics include carbon fiber, fiberglass, aramid fiber and polyester fiber. It is desirable to use carbon fiber as the reinforcing fiber to enhance the overall strength of the head. More specifically, it is desirable to use carbon fibers arranged in two perpendicular orientations to provide shock resistance along all planes. For maximum strength, it is desirable for the matrix resin to be an epoxy resin. Furthermore, by dispersing high elasticity and high density components such as tungsten powder in the matrix resin, the vibration properties of the head can be improved and good acoustics can be provided at impact.

A bidirectionally reinforced epoxy resin has reinforcing fibers in two perpendicular orientations within a matrix resin. When a carbon fiber is used to bidirectionally reinforce an epoxy resin, it is desirable to have an amount of carbon fiber in the range from 40 to 70% of the volume. In this case, the specific strength would be in the range from 35 to 60 kg/mm$^2$. Specifically, for carbon fiber bidirectionally reinforced epoxy resins, it is possible to use roving cloth made from high-elasticity carbon fibers, or prepreg in which plain cloth is impregnated with uncured epoxy resin (e.g., "PYROFIL TR3110-340", produced by Mitsubishi Rayon Corp.).

A hollow head having a volume of 400 cc can be made from a carbon fiber bidirectionally reinforced epoxy resin having a carbon fiber content of 40% volume and a specific strength of 35 kg/mm$^2$. This results in a head with a moment of inertia of $4 \cdot 10^{-4}$ kg·m$^2$, which is adequately high enough to minimize the veering of the ball and the loss in distance within an acceptable range. In this case, the thinnest section of the head is 3 mm and the minimum thickness at the face is 6 mm. This provides the head an adequate strength to avoid the danger of the head breaking due to impact.

In addition to using carbon fiber bidirectionally reinforced epoxy resin, it is also possible to use other materials having a specific strength of at least 30 kg/mm$^2$ for the head of the present invention. While expensive, a prepreg having a carbon fiber content composite material can be used (e.g. "PYROFIL TR3110-340" which has a carbon fiber content of 40% by volume, produced by Mitsubishi Rayon Corp.).

Using a prepreg, it is possible to create ahead by cutting the prepreg to the necessary shape, and layering the necessary number of sheets in the inside surface of a two-part concave mold. A tube-shaped bag made from nylon or the like is placed inside the two-part concave mold prior to closing the mold. After the mold is closed, the mold is placed in a furnace in order to cure the resin. While the mold is heated in the furnace, pressurized air is blown into the bag. Thus, the layered prepreg is cured while it is pressed against the mold.

As described above, a golf club head designed in accordance with the present invention provides a head volume of at least 300 cc and a higher moment of inertia when compared to conventional technology. It is desirable for the value of the moment of inertia to be at least $4 \cdot 10^{-4}$ kg·m$^2$. When the moment of inertia is at least $4 \cdot 10^{-4}$ kg·m$^2$, the veering of the ball is very small even when the ball is hit slightly away from the sweet spot of the face of the head. The corresponding reduction in flight distance is also minimized.

Since a material having a specific strength of at least 30 kg/mm$^2$ is used, the head can be kept thick while maintaining a high moment of inertia. This prevents head breakage due to impact and the like. More specifically, the minimum thickness of the face is at least 4 mm so that stress is not concentrated on a single section of the face, which is where impact is received. Thus, the head volume can be up to 900 cc without having head breakage due to impact and the like.

In a golf club head designed according to the present invention, a metal film and/or a metal fiber paper is layered on the head surface. Since the head is made of a carbon fiber cloth reinforced epoxy resin, a head without a metal outer surface is subject to wear due to impacting the head. This metal layer improves the head's resistance to wear while also improving the impact strength. Also, this allows a superior design to be provided for the head. The metal film (or metal fiber cloth) can be made from any suitable material such as titanium, nickel, aluminum, brass, iron, and the like. The metal layer preferably has a thickness in the range of 0.01 to 0.5 mm is appropriate. A superior head design can be achieved when a metal outer layer is implemented in accordance with the invention.

Figure 5:
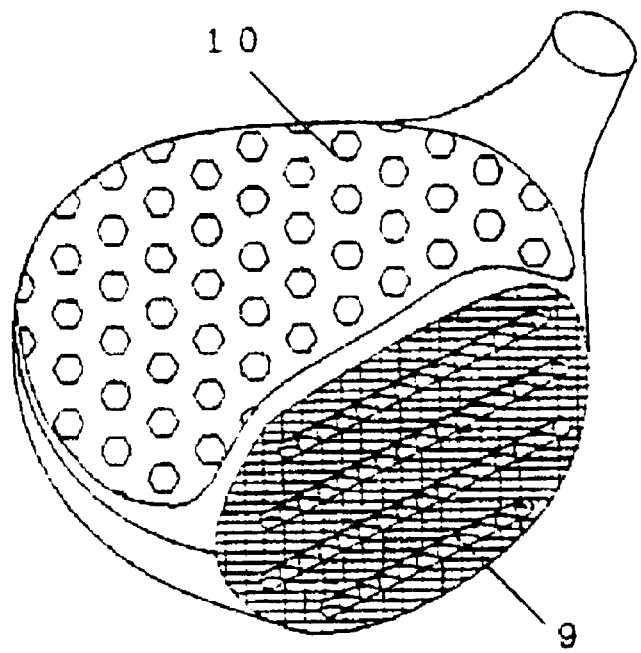
FIG. 5 is a perspective drawing showing the outer appearance of a golf club head layered with metal film and metal fiber paper.
Figure 5:
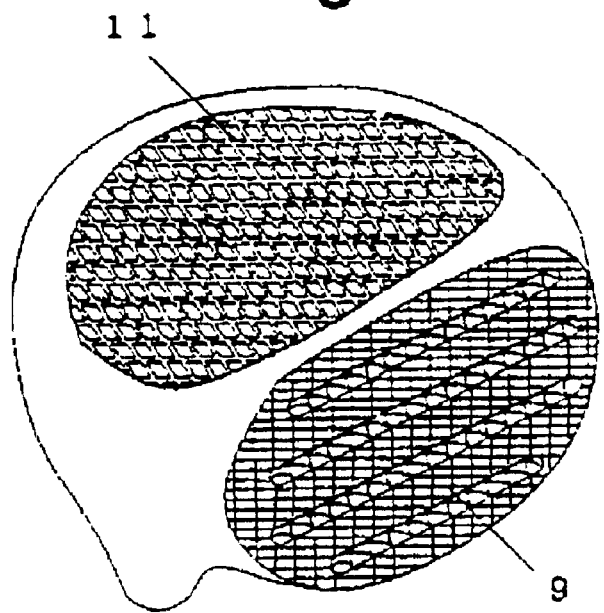

For the above described metal film or metal fiber cloth, it is possible to use an integrally layered fiberglass scrim cloth. Metal films are available with and without holes, and either type can be used. Metal films with holes have holes formed in the material by through punching or the like. Metal films with holes can also be formed from a film having a series of slits in the material by stretching the material in a direction which is perpendicular to the slits. Either type of material can be used. As shown in FIG. 5($a$), a metal fiber paper is layered on the face of a head, which is formed with score lines. A metal film through which holes are punched is layered on the crown. As shown in FIG. 5($b$), a metal film with stretched slits is layered on the sole. The metal fiber paper and the metal film having holes are highly flexible, thus allowing them to be freely shaped along curved surfaces, cavities, and projections.

In a head designed in accordance with the present invention, it is also possible to provide a metal plate on the sole to lower the center of gravity. It is also possible to move the center of gravity rearward by attaching a back metal piece to the sole, or by placing a balance weight or foam body inside the hollow section of the head.

Heads have been designed and manufactured in accordance with the present invention. Examples of the design and manufacture of these heads follow below.

Embodiment 1

A head was manufactured from a carbon fiber content composite material having a carbon fiber content of 40% by volume (e.g. "PYROFIL TR 3110-340", made by Mitsubishi Rayon Corp. Ltd.). The material is a carbon fiber bi-directionally reinforced epoxy resin prepreg. Prepreg material was cut into appropriate shapes and in an appropriate number of sheets. The cut prepreg materials were layered on the inside surface of a two-piece concave split mold. A nylon, tube-shaped bag is disposed inside the mold when it is being assembled.

The assembled concave mold was placed in a furnace and heated at 130° C. for 1 hour. While the mold was heated, pressurized air was blown inside the nylon bag at a pressure of 4 kg/cm$^2$. After setting, the mold was split and the desired head obtained. The head had a weight of 180 g, a moment of inertia of $5.0 \cdot 10^{-4}$ kg·m$^2$, a volume of 500 cc, a minimum thickness of 5 mm at the face, and a loft angle of 13°.

A golf club was formed by attaching a carbon fiber bidirectionally reinforced epoxy resin shaft to the above described head. This golf club was attached to a swing robot and 1000 balls were hit at a head speed of 50 m/sec with no breakage. Field tests were conducted using this golf club with a swing robot at a head speed of 40 m/sec. At this speed, it was found that the balls dropped mainly within a range of a few meters from a target 200 m away from a tee-shot position.

Embodiment 2

According to this embodiment, a head was manufactured with a carbon fiber content composite material having a carbon fiber content of 40% by volume (e.g. "PYROFIL TR 3110-340", made by Mitsubishi Rayon Corp. Ltd.). The material was a carbon fiber bi-directionally reinforced epoxy resin prepreg. Prepreg material was cut into prescribed shapes and in an appropriate number of sheets. The cut prepreg materials was layered on the inside surface of a two-piece concave split mold. A nylon, tube-shaped bag was disposed inside the mold when it is being assembled.

The assembled concave mold wag placed in a furnace and heated at 130° C. for one hour. While the mold was heated, pressurized air was blown inside the nylon bag at a pressure of 4 kg/cm$^2$. After setting, the mold was split and the desired head obtained. The head had a weight of 180 g, a moment of inertia of $6.0 \cdot 10^{-4}$ kg·m$^2$, a volume of 700 cc, a minimum thickness of 5 mm at the face, and a loft angle of 13°.

A golf club was formed by attaching a carbon fiber bidirectionally reinforced epoxy resin shaft to the above described head. This golf club was attached to a swing robot and 1000 balls were hit at a head speed of 50 m/sec with no breakage. Field tests were conducted using this golf club with a swing robot at a head speed of 40 m/sec. At this speed, it was found that the balls dropped mainly within a range of a few meters from a target 200 m away from a tee-shot position.

Embodiment 3

A carbon fiber cloth reinforced epoxy resin prepreg having a fiber content of 40% volume is used to make ahead (e.g. Mitsubishi Rayon Corp.'s "PYROFIL (registered trademark) TR3110-340")). The prepreg is cut into prescribed shapes and in a prescribed number of sheets. The sheets are layered on the inner surfaces of a two-piece concave mold. Each layered sheet is oriented in one of two directions so that the fibers in each adjacent sheet are oriented in a direction perpendicular to one another. A titanium film is disposed at the outermost layer. When the two-pieces of the mold are being closed together, a nylon tube bag is disposed inside the mold.

Figure 6:
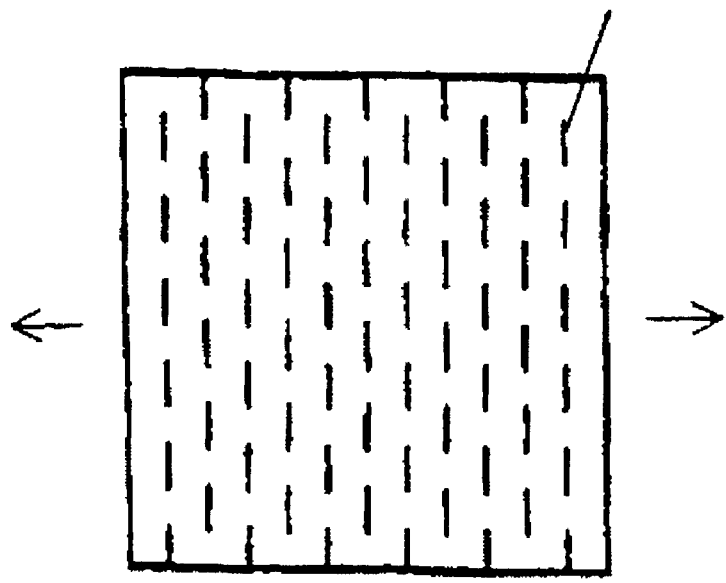
FIG. 6 is a drawing for the purpose of describing how to make a metal film formed with stretched slit openings.
Figure 6:
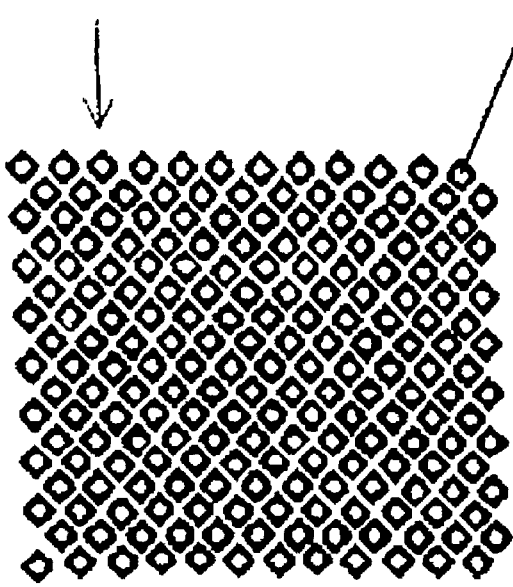

The titanium film can be made from a metal hybrid prepreg (e.g., Shinnittetsu Kagaku Corp.'s "MX0100/001/1120-K03/R10K03" products). Referring to FIG. 6, a titanium film (11) is formed with slits (11-1) disposed at fixed intervals along the film. Then, the titanium film is stretched in a direction perpendicular to slits (11-1) as indicated by the arrows shown in FIG. 6(*a*). The metal in the titanium film expands as it is stretched and forms openings (11-2) as shown in FIG. 6(*b*). On both sides of the titanium expanded metal are adhesed prepregs in which epoxy resin that cures at 130° C. is impregnated in fiberglass scrim cloth.

Then, the concave mold is placed in a furnace and heated at 130° C. for one hour to cure the resins. While the mold is curing, pressurized air is blown into the nylon bag at a pressure of 4 kg/cm$^2$ G. After curing, the mold is split, and the desired head is retrieved. The resulting head has a carbon fiber cloth reinforced epoxy resin with a specific strength of 60 kg/mm$^2$, a weight of 180 g, a moment of inertia of $6.0 \cdot 10^{-4}$ kg·m$^2$, a volume of 700 cc, a minimum face thickness of 5 mm, and a loft angle of 13°.

A carbon fiber cloth reinforced epoxy resin shaft was attached to this head to form a golf club. The golf club was attached to a swing robot and 1000 balls were hit at a head speed 50 m/sec without breakage. Field tests were performed using a swing robot at a head speed of 40 m/sec. At this speed, it was found that balls dropped mostly within a range of a few meters from a target point 200 m away from a tee-shot position.

Since the entire surface of the golf club head is covered by a titanium film, friction damage to the face and the sole were minimized. Also, since the titanium sole is formed with a film having slit openings, a superior head design is provided.

As described above, golf club heads according to the present invention provide reduced veering in the flight path of the ball. The reduced veering in the flight path also reduces the corresponding loss in distance when compared to conventional head designs. Thus, a golf club is provided that delivers the ball far and straight. Furthermore, since adequate thickness is provided for the face, the golf club head is not damaged from impact. Since a metal film and/or a metal fiber paper is disposed on the surface of the head, wear resistance is improved and a superior head design is provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hollow golf club head comprising:
   a material having a specific strength of at least 30 kg/mm$^2$ wherein a moment of inertia around a vertical axis passing through a center of gravity when said head is in a usage position is 4·10−4 kg·m$^2$; and
   said hollow golf club head having a volume of at least 400 cc.

2. A golf club head as described in claim 1 wherein said head has a maximum weight of 200 g.

3. A golf club head as described in claim 2 wherein said head has a volume in a range from 400 to 900 cc.

4. A golf club head as described in claim 3, wherein said head has a face with a minimum thickness of 4 mm.

5. A golf club head as described in claim 4 wherein an exterior surface of said head is layered with a metal fiber material.

6. A golf club head as described in claim 5 wherein said metal fiber material has a plurality of openings.

7. A golf club head as described in claim 6 wherein said material is a carbon fiber, bidirectionally reinforced epoxy resin.

8. A hollow golf club head for striking a golf ball when said golf club head is in a usage position, comprising:
   a composite material formed in a shape;
   said hollow golf club head having a volume of at least 400 cc;
   said composite material having a specific strength in a range from 30 to 60 kg/mm$^2$; and
   a moment of inertia around a vertical axis passing through a center of gravity of said golf club head when said golf club head is in a usage position.

9. A hollow golf club head as in claim 8 wherein said moment of inertia is at least 4·10$^{-4}$ kg·m$^2$.

10. A hollow golf club head as in claim 9 wherein said golf club head has a volume in a range from 400 to 900 cc.

11. A hollow golf club head as in claim 10, wherein said composite material has a head thickness of at least 3 mm.

12. A hollow golf club head as in claim 11, wherein said composite material includes a reinforced fiber.

13. A hollow golf club head as in claim 12, wherein said composite material includes a matrix resin.

14. A hollow golf club head as in claim 8 wherein said golf club head has a maximum volume of 900 cc.

15. A hollow golf club head as in claim 8, wherein said composite material has a head thickness of at least 3 mm.

16. A hollow golf club head as in claim 8, wherein said composite material includes a reinforced fiber.

17. A hollow golf club head as in claim 16, wherein said reinforced fiber includes at least one of carbon fiber, fiberglass, aramid fiber and polyester fiber.

18. A hollow golf club head as in claim 8, wherein said composite material includes a matrix resin.

19. A hollow golf club head as in claim 18, wherein said matrix resin includes at least one of epoxy resin, unsaturated polyester resin and vinyl ester resin.

20. A hollow golf club head as in claim 18, wherein a component is dispersed within said matrix resin, said component having a high elasticity and high density.

21. A hollow golf club head as in claim 20, wherein said component includes tungsten.

22. A hollow golf club head as in claim 8, wherein said composite material includes a bidirectionally reinforced matrix resin having an amount of reinforcement material dispersed therein.

23. A hollow golf club head as in claim 22, wherein said amount of reinforcement material is a minimum of 40% of a total volume of said matrix resin.

24. A hollow golf club head as in claim 22, wherein said amount of reinforcement material is a maximum of 70% of a total volume of said matrix resin.

25. A hollow golf club head as in claim 22, wherein said amount of reinforcement material is in a range from 40% to 70% of a total volume of said matrix resin.

26. A hollow golf club head as in claim 8, wherein:

said composite material has a first layer formed on a second layer;

said first layer including reinforced fibers aligned along a direction; and said second layer including reinforced fibers aligned perpendicular to said direction.

27. A hollow golf club head as in claim 8, wherein said composite material has an outermost metal fiber layer.

28. A hollow golf club as in claim 27, wherein said metal fiber layer has a plurality of openings dispersed thereon.

29. A hollow golf club as in claim 27, wherein said metal fiber layer includes at least one of stainless steel, titanium alloy, and high-tensile aluminum alloy.

30. A hollow golf club head as in claim 8 wherein:

said moment of inertia is at least $4 \cdot 10^{-4}$ kg·m$^2$;

said golf club head has a volume in a range from 400 to 900 cc;

said composite material includes a bidirectionally reinforced matrix resin having an amount of reinforcement material dispersed therein;

said amount of reinforcement material is in a range from 40% to 70% of a total volume of said matrix resin; and said matrix resin includes tungsten dispersed therein.

* * * * *